Nov. 22, 1955     W. O. LYTLE     2,724,658
RESISTOR COATING METHOD
Filed Feb. 16, 1950     3 Sheets-Sheet 1
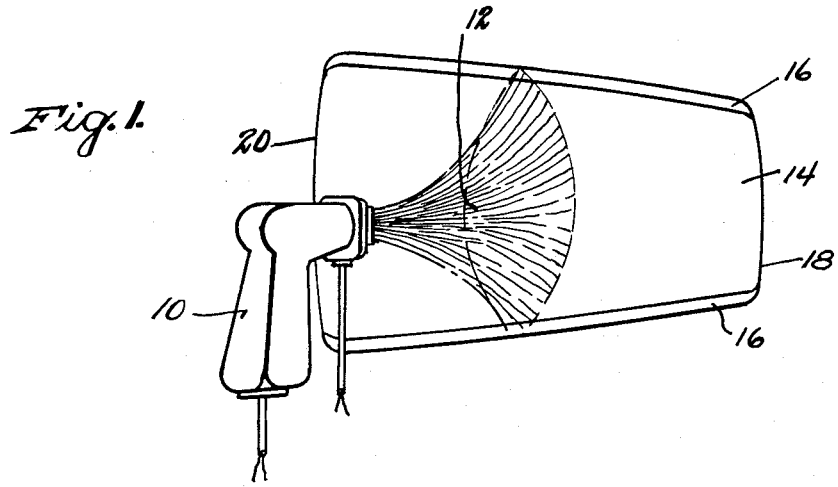
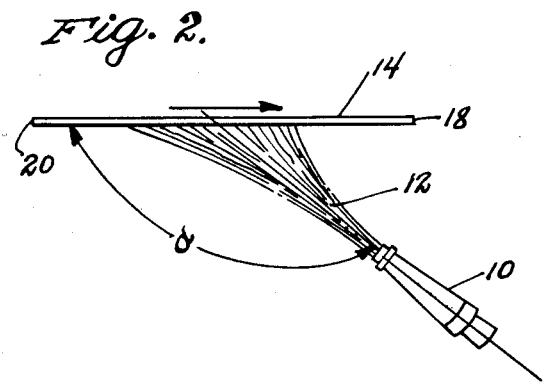
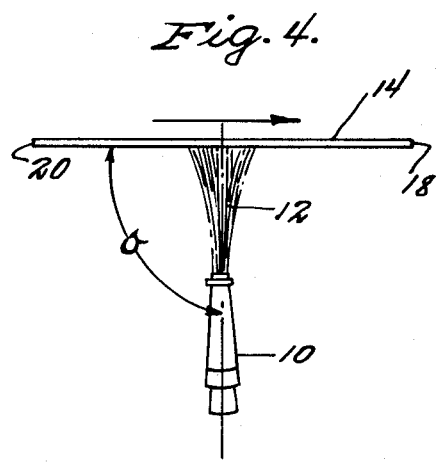
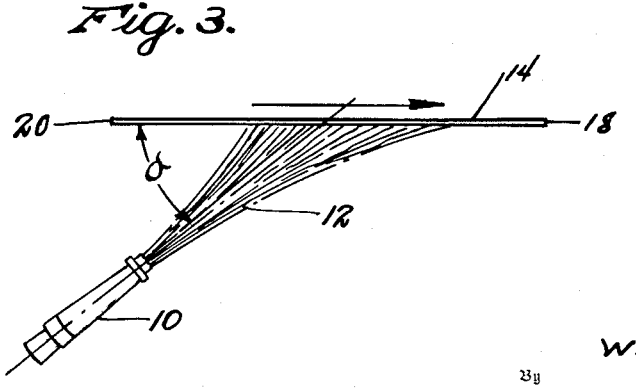
Inventor
WILLIAM O. LYTLE
By Olen E. Bee
Attorney Nov. 22, 1955      W. O. LYTLE      2,724,658
RESISTOR COATING METHOD Filed Feb. 16, 1950      3 Sheets-Sheet 2

Inventor
WILLIAM O. LYTLE

By
Olen E. Bee
Attorney

Nov. 22, 1955 W. O. LYTLE 2,724,658
RESISTOR COATING METHOD

Filed Feb. 16, 1950 3 Sheets-Sheet 3

Inventor
WILLIAM O. LYTLE
By Olen E. Bee
Attorney

United States Patent Office 2,724,658
Patented Nov. 22, 1955

2,724,658

RESISTOR COATING METHOD

William O. Lytle, New Kensington, Pa., assignor to Pittsburgh Plate Glass Company, Allegheny County, Pa., a corporation of Pennsylvania Application February 16, 1950, Serial No. 144,429

8 Claims. (Cl. 117—54)

This invention relates to a novel method of providing a transparent glass or other refractory base with a transparent electroconductive coating thereon. It is known that transparent electroconductive films may be deposited upon glass by applying stannic chloride to the surface of glass heated above 400° F., preferably 850 to 1350° F. Films of superior conductivity may be produced according to methods described in my application Serial No. 762,659, filed July 22, 1947, now Patent No. 2,648,754, of which this application is a continuation-in-part. These films or coatings are obtained by spraying plate, window or other glass base while it is heated to a temperature above 400° F. but below the temperature at which the glass becomes molten, with tin tetrachloride or other tin salt in aqueous or other solution or in vapor state, usually in the presence of certain agents, such as methanol, phenylhydrazine hydrochloride, etc. The films thus obtained are of unknown composition, but appear to contain a preponderant amount usually about 97 to 99% or more of a tin oxide, together with certain impurities including metallic tin, carbon, silica, sodium, chlorine and other impurities, depending upon the composition of the applied tin-containing solution. These films have a thickness of about 50 to 800 millimicrons, are transparent and have the unusual characteristic of being electroconductive, the particular degree of electroconductivity being dependent to a great extent upon the nature of the process of depositing the films. Tin oxide films, which are deposited in accordance with the process as described and claimed in my aforesaid appplication, incorporation of the disclosure of which is made a part hereof by reference, have a resistance below 500 ohms per unit square, a specific resistance below about 0.01 ohm-centimeter and a haze factor below about 2.5%.

Articles described in the aforesaid application are useful in many fields and have been found to be particularly useful as windshields or viewing closures in automobiles, aircraft, trains and similar motive vehicles. In such use, the coating is placed in series with a source of electric potential and is used as a heating element in order to heat the closure and thus prevent deposition of ice, fog, moisture, etc. thereupon.

The articles herein contemplated, comprise a glass sheet, usually of plate glass or other flat glass structure (including bent or curved glass structures) provided with conductive metal strips suitable for bus bars. These bus bars normally are located adjacent opposed edges of the glass preferably on opposed marginal edges or at least within 0.5 inch of an edge. For example, in an essentially rectangular viewing closure such as a windshield, two bus bars are applied on a pair of opposite marginal edges.

The provision of panels which are exactly rectangular in contour has not offered serious complication since in such a case, a film of essentially uniform conductivity may be applied to the surface of the glass and little difficulty is encountered in heating the glass by passage of electric current through the film. However, windshields and other like panels are not exactly rectangular in shape and usually vary in width from one end to the other. Consequently, when an essentially uniformly conductive film has been deposited upon such panels, they frequently have failed in use or in test. This failure is manifested by fracture of the glass during passage of current through the electroconductive film.

To a large degree, it has been found that this failure is due to the fact that unduly high current density tends to be established along certain portions of such panels. This is due to the fact that in a non-rectangular sheet the distance between the edges and thus between the bus bars will not be exacly uniform throughout the entire length of the panel. Consequently, a greater current flow tends to be established where the bus bars are close than is established where the bus bars are further away.

In addition, one or more of the edges of the panel frequently may be curved. In such a case, it is desirable to taper the bus bar along the curved edge and to terminate the bar at a point at the edge but beyond the middle of the curve. This reduces the tendency to establish an unduly high current density at the end of the bus bar. At the same time, since the bus bar terminates at a point which may be closer to the opposed bus bar than any other point along the first named bus bar, high current density tends to be established at such point.

It has been found according to this invention that the irregular current density which tends to be established tends to set up serious strains within the panel and thus to cause fractures. This irregular current density may be made more uniform, at least to an extent such that fracture of the glass does not occur to a serious degree, by providing the glass panel with a transparent electroconductive film which is non-uniform in surface resistivity. Thus, it has been found according to this invention that it is advantageous to provide a film which has a surface resistivity which is higher across sections of the panel where the opposed bus bars are closer together than across sections of the panel where the opposed bus bars are relatively more distant. More particularly, establishment of an excessively high current density along the ends of the panel, and the ends of the bus bars, may be inhibited to an appreciable degree by providing a film which is higher as to surface resistivity along the ends of the panel than in a central area of the panel. As a consequence, higher current flow tends to be established in the central area of the panel than along its edges.

According to the present invention, it has been found that this film distribution may be achieved in a very simple manner. Thus, in the practice of the present invention, the glass sheet is suspended, for example, substantially in a vertical plane, and a spray of the film-forming composition, such as stannic chloride, is directed in a substantially horizontal plane. The panel to be coated is heated to an elevated temperature above 400° F., usually 800 to 1250° F., as previously described and the heated panel while in a substantially vertical plane is moved edgewise through the spray without oscillation of the panel, the rate of removal of the panel being sufficient to permit formation of a film but insufficient to permit establishment of a film having a thickness greater than about 800 millicrons. When such a thin film is thus produced by forward movement of the panel through the spray at constant speed, it has been found that the surface conductivity of the film adjacent the leading edge of the panel, i. e. the edge which first enters the spray, is substantially less than the surface conductivity of the film in the central portion of the panel. This affords a convenient method of insuring a film area of low conductivity immediately adjacent a pair of opposed ends of the bus bars.

The desired resistance distribution of the film may be established simply by passing the panel through the spray, using as the leading edge the side of the panel desired to have highest surface resistivity. The panel may be coated with the conductive film either before or after the bus bars have been disposed thereon.

Where the bus bars have been disposed along a pair of side edges and it is desired to provide a film having an end portion which is high as to resistivity, then such end is made the leading edge of the panel as it passes through the spray. Where a long bus bar is disposed along one side and a shorter bus bar along the opposite side, the film may be applied by passing the panel through the spray using the long bus bar side as the leading edge.

The spraying is effected by relative movement of the panel continuously forward edgewise and at a substantially constant speed with respect to the spray. Thus the panel may be passed through the spray by moving the panel and holding the spray stationary or by holding the panel stationary and moving the spray. Frequently the panel is held vertically and moved through a horizontally directed spray. However the panel may be held horizontally and the spray directed vertically. Thus in most cases, the panel is supported so that its lateral axis is in a plane perpendicular to the axis of the path of the spray, the panel moving in a longitudinal direction. Where variation in resistivity from one side to the other is permissible, the panel may be held at some other angle. Usually the panel moves in a substantially straight line although some deviation is permissible to establish special resistivity patterns.

In accordance with a further embodiment of the invention, a convenient method has been provided for exaggerating the conductivity distribution of the film above described or compensating therefor. For example in cases where a more exaggerated effect is desired in order to obtain a much greater electroconductivity of the film in the central portion of the panel with respect to that of the film adjacent the leading edge thereof, the panel may be passed through the spray at an angle of approach (measured with respect to the axis of the path of the spray) greater than 90°.

Conversely, the non-uniformity in the conductivity of the film over the entire surface may be compensated to a substantial degree by passing the glass sheet or panel through the spray at an angle of approach less than 90°. In this event, the tendency to form an area of low conductivity immediately adjacent the leading edge of the glass sheet is materially lessened and may even be completely eliminated.

It will thus be apparent that according to the present invention methods have been provided for varying the electroconductivity of the film or to achieve various convenient surface resistivity distributions as desired. Moreover, according to this invention, a novel article has been provided which comprises a glass panel, bus bars disposed along a pair of opposed edges of the panel, and wherein the resistance distribution of the film is such that the surface resistivity of the major portion of the area between the bus bars is less than the surface resistivity of the film immediately adjacent another edge thereof.

Accomplishment of the foregoing constitutes some of the principal objects of the present invention, others of which will become apparent by reference to the ensuing description, taken in conjunction with the accompanying drawing in which:

Fig. 1 is a diagrammatic perspective view illustrating a method of depositing a transparent electroconductive film upon a glass or like refractory base according to the present invention;

Fig. 2 is a diagrammatic plan view of a method of depositing a transparent film according to the present invention in which the glass or like panel is passed through the spray at an angle of approach α greater than 90°;

Fig. 3 is a plan view similar to Fig. 2 and diagrammatically illustrates an embodiment of the present invention in which the glass or like plate is passed through the spray at an angle of approach α less than 90°;

Fig. 4 is a diagrammatic plan view of an embodiment of the invention in which the plate is passed through the spray at an angle of approach α of substantially 90°;

Figure 5:
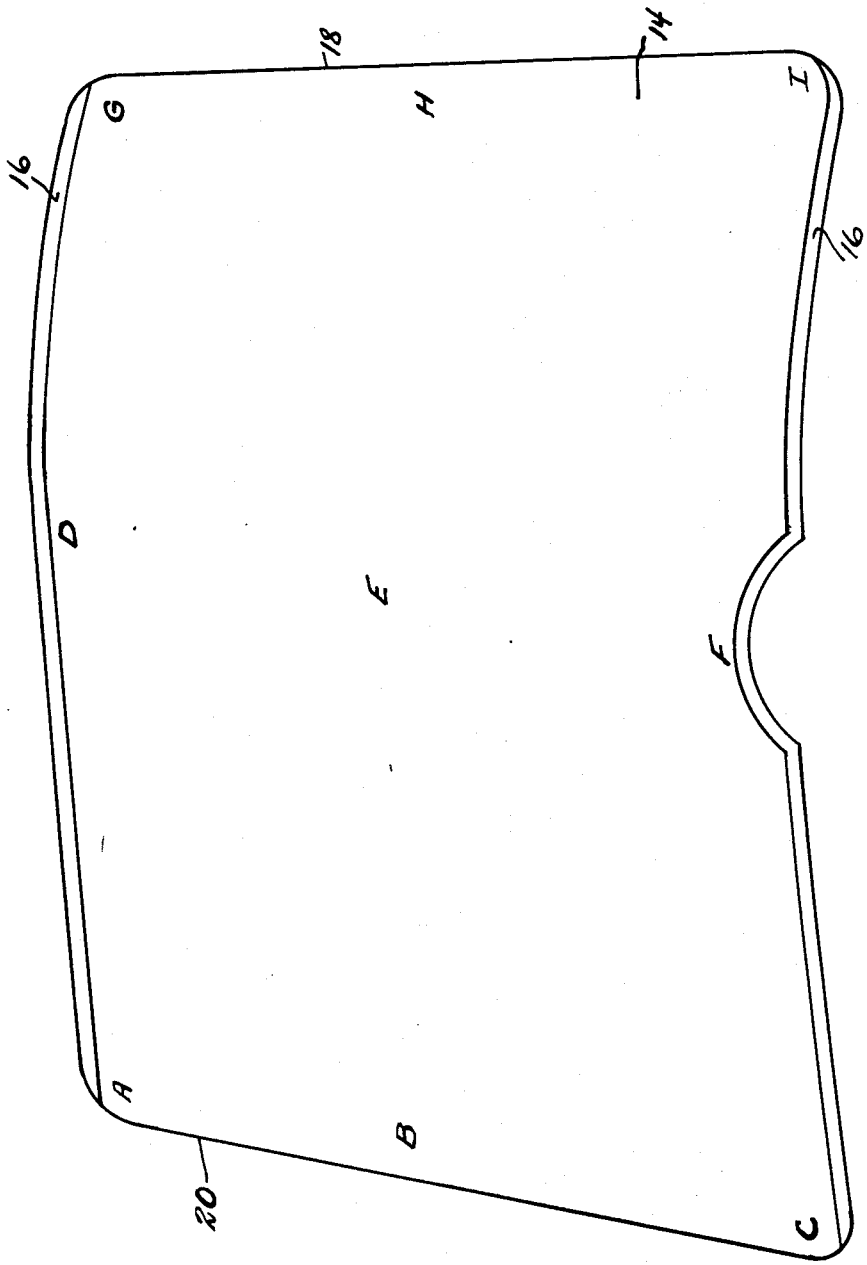
Fig. 5 is a diagrammatic plan view of a panel having a transparent electroconductive film which has a surface resistivity distribution contemplated according to the present invention.

It will be understood that the angle of approach is measured as indicated by the angle in the drawing (Figs. 2 to 4) between the center line of the path of spray and the face of the sheet to be coated, measured clockwise from the approach side of the spray.

In the practice of the invention, a spray of the film-forming material is established as illustrated in Fig. 1, by use of a spray gun 10 which projects the spray 12 in a horizontal direction. A suitable glass panel 14 to be coated is passed edgewise through the spray as illustrated in the various Figures 1 to 4 inclusive. In general, this panel is provided with bus bars 16 prior to the coating operation. However, as will be discussed hereinafter, the bus bars may be applied after the coating operation intermediate a pair of coating operations. The spray gun is so adjusted as to provide a spray having a width at least equal to the width of the panel to be coated in order that the entire panel may be coated in a single pass through the spray, since articles of substantial width, for example six inches to several feet in width, are coated. This normally requires establishment of a spray pattern having an oval contour as indicated by the dotted line in Fig. 1. One or several spray guns may be necessary in order to establish the desired spray.

Various compositions which are capable of producing a transparent electroconductive film may be used. Typical compositions of this character include the following:

1. Stannic chloride pentahydrate____ 900 grams.
   Methanol _____ 63 milliliters.
   Phenyl hydrazine _____ 21 grams.
   Dioctyl sodium sulphosuccinate
     solution _____ 30 milliliters.
       The dioctyl sodium sulphosuccinate solution was prepared by mixing:
         Dioctyl sodium sulphosuccinate_____ 10 grams.
         Methanol _____ 45 milliliters.
         Water _____ 45 milliliters.
2. Anhydrous stannic chloride_____ 1000 cubic centimeters.
   Methanol (anhydrous) _____ 2000 cubic centimeters.
   Ammonium acid fluoride_____ 60 grams.
   Butyl carbitol acetate_____ 3000 cubic centimeters.
3. Stannic chloride pentahydrate____ 90.0% by weight.
   Formaldehyde, aqueous solution
     (containing 40% formaldehyde) _____ 10.0% by weight.
4. Stannic chloride pentahydrate____ 900 grams.
   Phenylhydrazine hydrochloride __ 21 grams.
   Methanol _____ 90 milliliters.
5. Anhydrous stannic chloride_____ 1000 cubic centimeters.
   Methanol _____ 5000 cubic centimeters.
   Ammonium bifluoride _____ 100 grams.
6. 90 percent by weight $SnCl_4 \cdot 5H_2O$.
   10 percent by weight aqueous formaldehyde (containing 40 percent by weight of formaldehyde).
7. 900 grams $SnCl_4 \cdot 5H_2O$.
   21 grams phenyl hydrazine hydrochloride.
   90 milliliters methanol.
8. Anhydrous stannic chloride_____ 20,430 grams.
   Methanol _____ 1854 milliliters.
   Phenyl hydrazine _____ 21 grams.
   Water _____ 7,056 milliliters.
   Dioctyl sodium sulfosuccinate
     solution _____ 918 grams.
       Such solution composed of:
         Dioctyl sodium sulfosuccinate _____ 10 grams.
         Methanol _____ 45 milliliters.
         Water _____ 45 milliliters.
9. Solution No. 8 (without dioctyl
     sodium sulfosuccinate) _____ 70 milliliters.
   Aqueous formaldehyde containing
     40% by weight of formaldehyde _____ 45 grams.
   Ammonium bifluoride _____ 3 grams.

10. Solution No. 8 _____ 100 grams.
    Antimony trichloride _____ 1 or 2 grams per gram of stannic chloride in Solution No. 8.
11. Stannous fluoride _____ 5 grams.
    Methanol _____ 4 grams.
    Water _____ 25 grams.
12. Methanol _____ 1000 milliliters.
    Anhydrous stannic chloride_____ 170 milliliters.
    Ammonium bifluoride _____ 6 grams.
13. Stannous acetate _____ 4 grams.
    Methanol _____ 30 milliliters.
    12 normal hydrochloric acid in amount sufficient to dissolve the stannous acetate (solution normally aged overnight).
14. 20 grams zinc acetate—$Zn(C_2H_3O_2)_2 \cdot 2H_2O$.
    50 grams water.
    5 grams phenyl hydrazine hydrochloride.
15. Two parts by volume anhydrous $SnCl_4$.
    One part by volume glacial acetic acid.
16. 150 grams cadmium acetate.
    100 grams water.
17. 75 grams cadmium bromide.
    100 grams water.
    One volume of 30% aqueous hydrogen peroxide per volume of cadmium bromide solution.
18. Saturated indium trichloride in methanol.

In addition, it will be understood that various other compositions can be used. For example, anhydrous stannic chloride may be sprayed in accordance with the present invention. Other compounds capable of producing transparent electroconductive films by spraying such compounds upon heated glass may be considered to be substantially the equivalent of stannic chloride for the purpose of this invention, even though the results obtained are not exactly identical. Especially effective are the stannic halides including stannic chloride, stannic iodide, stannic bromide and stannic fluoride.

As shown in Fig. 1, it will be noted that the leading edge 18 of the glass panel is shorter than the trailing edge 20. While the present invention is applicable to the provision of transparent films upon sheets and other bases of various contours, it is particularly applicable to the problem of providing films upon sheets where the width thereof is not uniform, being narrower at one end than at the other. In such a case, the sheet is passed through the spray in an edgewise direction with the shortest edge as the leading edge.

As previously stated, the film distribution is controlled to an appreciable degree by the angle of approach between the sheet and the center line of the spray. Where the angle of approach is substantially 90° as indicated by the angle alpha in Fig. 4, the conductivity of the film immediately adjacent the leading edge 18 is substantially lower than that adjacent the trailing edge 20 because the film adjacent the leading edge is much thinner. This condition may be exaggerated by increasing the angle of approach above 90° as indicated by the angle alpha in Fig. 3. Furthermore, the same condition tends to be established although to a lesser degree even when the angle alpha is less than 90° but not less than about 10–15°. Hence, the tendency to establish a thin film adjacent the leading edge of the sheet may be minimized and compensated for to any desired degree by decreasing the angle alpha substantially below 90° as shown in Fig. 2.

As a typical example, a sheet of glass having the contour shown in Fig. 5, the distance between the points X and Y being approximately 26½ inches, and the drawing being otherwise substantially to scale. Prior to the film-forming operation, the panel was provided with metal bus bars 16 on the margins along the sides of the elongated panel. These bus bars were disposed along the longest pair of opposed edges or sides and within 0.5 inch from the edge, in actual contact with the edge and were about from ½ inch in width. These bus bars tapered as shown to a point along the edge of the glass panel, the length of the tapered portion of which may be up to one or two inches.

To produce a well bonded bus bar, an enamel frit was prepared by fusing together:

| | Parts by weight |
|---|---|
| Litharge | 70 |
| Boric acid | 16 |
| Silica | 14 |

This frit was ballmilled to minus 325 mesh powder and the conducting composition prepared according to the following formula:

| | Parts by weight |
|---|---|
| Frit | 10 |
| Flake silver | 70 |
| French fat oil | 12.5 |
| Turpentine | 7.5 |

Using the above conductive enamel, bus bars were applied to the side marginal edges of the panel as indicated in Fig. 5. The thickness of these bus bars was below 0.0025″ although bus bars having thicknesses up to 0.005″ may be used if desired. The bus bars were tapered to a point at the edge of the panel beyond the center of the curve at the corners.

Following the application of the bus bars, the glass panel was heated in a furnace at a temperature of about 1150° to 1250° F. for two minutes. A spray gun was set up and was turned on to spray the solution No. 1 in a substantially horizontal direction. The heated glass plate was held vertically and the sheet was aligned with the spray so that the entire width of the panel could be coated.

In this particular instance, the spray gun was adjusted to produce a horizontally directed "split" or "dumbbell" type spray which is wider and more dense adjacent the upper and lower ends of the spray section than in the center thereof. The panel was so aligned with the spray that the bus bars were directed to the upper and lower denser areas of spray and the central area of the panel was essentially in line with the center of the spray. The panel was moved in an edgewise direction and with uniform forward speed through the spray at an angle of approach of approximately 90° within a matter of 3 or 4 seconds. Longer times of spray may be used but in any case a rate of movement should be sufficient to ensure removal of the panel from the spraying area before the film thickness of the panel exceeds about 800 millimicrons. Thereupon, the panel was allowed to cool.

The surface resistivity in terms of resistance per unit inch squares was measured in various areas designated as A, B, C, D, E, F, G, H, and I. Areas A, D, G, C, F, and I were located within about 1 or 2 inches of the side edges areas A, G, C and I being only about 2 inches from the ends of the sheet and areas D and F being about in the middle of the sheet. Areas B, E and H were located approximately midway between areas A and C, D, F, G, and E respectively. The surface resistivities in terms of ohms per unit square (the surface resistance of an area of 1 inch square) were as follows:

| | Ohms per unit square |
|---|---|
| Area A | 92 |
| Area B | 136 |
| Area C | 97 |
| Area D | 92 |
| Area E | 102 |
| Area F | 77 |
| Area G | 138 |
| Area H | 175 |
| Area I | 140 |

It will be understood that the resistance set forth above is the average resistance of a 1 inch square. Thus, even though the resistance may have been high or even infinite at a single point of minute area within the square the resistance of the square was as stated above. From the above table, it will be apparent that the areas of maximum resistance of the film are at the zones spaced from the bus bar and designated as H, which was adjacent the trailing edge of the panel. It will also be noted that the area B which is adjacent the trailing edge 20 of the panel is much lower in resistivity. Similarly, areas A and C are much lower in resistivity than the corresponding areas G and I which are adjacent the leading edge 18 of the panel.

It will be understood that considerable variation in resistance of the various areas is permissible. However, it is found preferable that the end of the panel where the bus bars are most closely disposed have the highest resistance areas, in order to compensate for the varying distance between the bus bars and thus to avoid establishment of an unduly hot spot adjacent the ends of the bus bars at the leading edge. The variation in surface resistance between the area adjacent the leading edge and the other areas need not be large but in general should be at least 5% higher than that of the central area of the panel.

Figure 6:
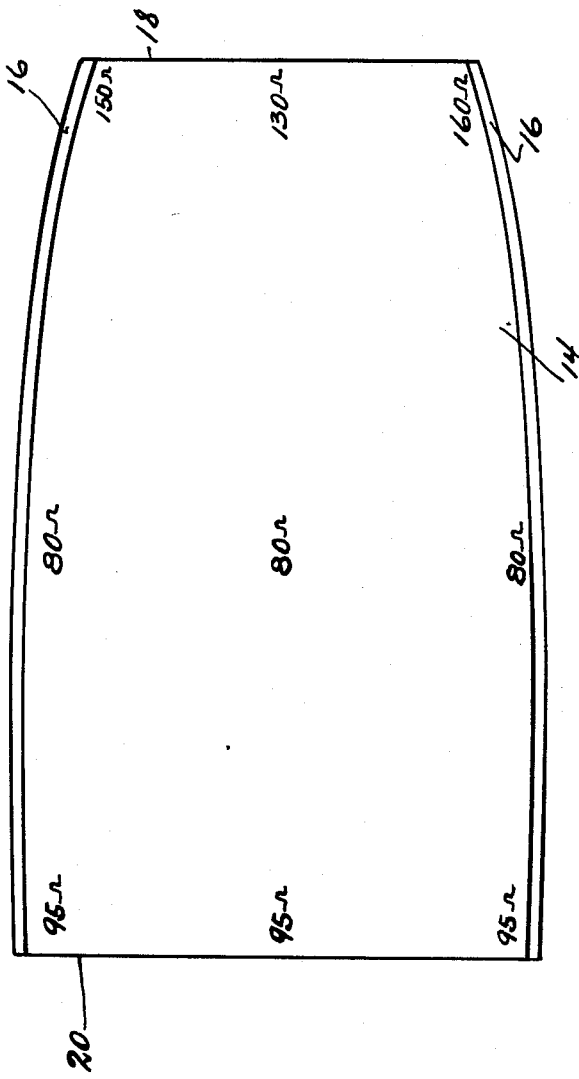
Fig. 6 is a diagrammatic view of a further panel indicating another surface resistivity distribution which is achieved by practice of the process diagrammatically illustrated in Fig. 2.

The panel illustrated in Fig. 6 was produced according to the embodiment diagrammatically illustrated in Fig. 3 wherein the angle of approach of the sheet to the spray was set at 135°. This panel which is drawn substantially to scale was 36 inches in length possessed one end 22 inches in length while the other end of the sheet was 15 inches in length. The sheet was passed through the spray at the aforesaid angle of 135° with the shorter or 15 inch edge as the leading edge. The thickness of the film was approximately 200 millimicrons. The surface resistivity in terms of ohms per unit square at the various areas of the sheet are indicated in the drawing. Thus, at the leading edge, the resistivities were respectively 150, 130 and 160 ohms per unit square.

It will be noted that embodiment illustrated in Fig. 6 is not provided with bus bars. These bus bars may be applied along the longer edges of the sheet after deposition of the transparent electroconductive film. Suitable compositions capable of producing an adherent conductive metal coating upon glass may be used for the purpose or an adherent metal spray may be used to deposit metal on the glass base. In order to improve adhesion the margins of the glass base may be roughened by grinding, etching or other method prior to deposition of the transparent coating.

It will be understood that numerous variations of the above described embodiments are within the scope of the invention. For example, the panel may be moved through the spray at a non-uniform forward speed in order to obtain coating having a thickness variation determined by the variation in rate of passage of the panel through the spray. Moreover, the sheet may be passed through the horizontally directed spray while holding the sheet in a plane at an angle from the vertical. Also, the sheet may be held horizontal and the spray directed vertically upward or downward. Although such variation is possible, the movement of the panel should be constantly forward.

In general, the panel to be coated comprises ordinary window or plate glass which is composed of lime-soda glass. However, other glass or glass-like refractory materials which do not melt or fuse at 1250° F. may be provided with electroconductive coating according to the invention. For example, the base to be coated may be of borosilicate glass, china, porcelain, mica, phosphate glass, stone, lead X-ray glass, tungsten carbide, aluminum oxide, marble, tungsten, etc.

Sheets of various sizes and shapes may be produced according to this invention. Thus, flat or curved rectangular, triangular, circular or elliptical panels may be provided. The invention is particularly applicable where the panel or sheet to be coated has curved sides since in such a case the opposed ends of the bus bars extending along the sides are noticeably closer than are the central areas thereof. This is the case for example in a circular disc where the bus bars extend along the margins thereof and thus the ends are relatively close together while central portions of the bus bar are quite distant. By applying the electroconductive film as herein described, the surface resistivity of the film adjacent the leading edge is maintained quite high thus compensating partially for the nonconformity in the distance between the bus bars.

Although the present invention has been described with reference to the specific details of certain embodiments thereof, it is not intended that such embodiments shall be regarded as limitations upon the scope of the invention except insofar as included in the accompanying claims.

What is claimed:

1. In a method of providing a refractory sheet with a non-uniform transparent electroconductive film by applying to the sheet while hot a film forming composition capable of producing a transparent electroconductive film thereon which comprises establishing a spray of said composition, heating the sheet to be sprayed to a temperature above 400° F. and below the softening temperature of the sheet, orienting said sheet in a plane perpendicular to the direction of spray, passing the sheet in an edgewise direction through the spray, and removing the sheet from the spray before the film thickness exceeds 800 millimicrons.

2. The process of claim 1 wherein the sheet is passed through the spray at an angle of approach not less than 30°.

3. In a method of providing a glass sheet with a non-uniform transparent electroconductive film by applying to the glass, while heated to a temperature above 400° F. and below the softening temperature of the sheet, a film forming composition capable of producing a transparent electroconductive film thereon which comprises establishing a spray of said composition, said spray being sufficiently wide to coat the sheet in a single pass, heating a glass sheet having a pair of opposed edges one of which is substantially shorter than the other and supporting the glass sheet in a substantially vertical plane, passing the sheet in an edgewise direction with said shorter edge as leading edge through the spray and removing the sheet from the spray while the film is transparent and before the film thickness exceeds 800 millimicrons.

4. In a method of providing a glass sheet with a non-uniform transparent electroconductive film by applying to the glass while heated to a temperature above 400° F. and below the softening temperature of the sheet a film forming composition capable of producing a transparent electroconductive film thereon which comprises establishing a spray of said composition directed in a substantially horizontal direction, said spray being at least as wide as the sheet to be sprayed, applying bus bars to a glass sheet having a pair of opposed sides and a pair of ends, one of said ends being shorter than the other, heating the glass sheet and supporting it in a substantially vertical plane, moving the sheet in a forward edgewise direction through the spray at an angle intersecting the path of the spray and with said shorter end as the leading edge and the sides substantially horizontal and removing the sheet from the spray while the film is transparent and before the film thickness exceeds 800 millimicrons.

5. In a method of providing a glass sheet with a non-uniform transparent electroconductive film by applying to the glass while heated to a temperature above 400° F. and below the softening temperature of the sheet a film forming composition capable of producing a transparent electroconductive film thereon which comprises establishing a spray of said composition directed in a substantially horizontal direction, supporting in a substantially vertical plane a heated glass sheet having a pair of opposed sides and a pair of opposed ends, one of the ends being shorter than the other, and passing the sheet in an edgewise direction through the spray with said shorter end as the leading edge entering the spray, removing the sheet from the spray while the resultant film is transparent and before the film thickness exceeds 800 millimicrons, and applying bus bars to the sides of the sheet.

6. In a method of providing a refractory sheet with a non-uniform transparent electroconductive film by applying to the sheet, while heated to a temperature above 400° F. and below the softening temperature of the sheet, a film forming composition capable of producing a transparent electroconductive metal oxide film thereon, the steps which comprise establishing a spray of said composition, heating the sheet to be sprayed, orienting said sheet in a plane perpendicular to the direction of spray, passing the sheet in an edgewise direction and constantly forward through the spray, and maintaining the rate of movement such that the sheet passes completely through the spray before the film thickness exceeds 800 millimicrons.

7. In a method of providing a glass sheet with a non-uniform transparent electroconductive metal oxide film by applying to the glass, while heated to a temperature above 400° F. and below the softening temperature of the sheet, a film-forming composition capable of producing a transparent electroconductive metal oxide film thereon, the steps which comprise establishing a spray of said composition, said spray being sufficiently wide to coat the sheet in a single path, heating a glass sheet having a pair of opposed edges, one of which is substantially shorter than the other, and supporting the glass sheet in a substantially vertical plane, passing the sheet in an edgewise and constantly forward direction, with the shorter edge as the leading edge, through the spray, and maintaining the rate of forward movement such that the sheet passes completely through the spray before the film thickness exceeds 800 millimicrons.

8. In a method of providing a surface of a refractory base with a non-uniform, transparent, continuous, electroconductive film by heating the base to a temperature above 400° F. and below the softening temperature of the base and spraying the heated base by means of a spray comprising a composition capable of producing a transparent electroconductive film upon contact with the base, the improvement which comprises orienting said base in a fixed plane, applying said spray about a fixed central axis thereof to said base from a point of origin of said spray located in a plane substantially parallel to and spaced from the plane of said base, orientating the direction of said central axis of the spray in a fixed angular relation to the plane of said base, providing relative motion between the heated oriented base and the spray at the point of origin thereof at a uniform velocity along a longitudinal axis lying in one of said spaced planes and discontinuing the spray before the maximum thickness of the sprayed film exceeds 800 millimicrons to provide a continuous, transparent, electroconductive film on the heated base whose thickness varies longitudinally of the axis of relative movement between the base and the spray.

References Cited in the file of this patent

UNITED STATES PATENTS

| | | |
|---|---|---|
| 2,061,107 | Schellenger | Nov. 17, 1936 |
| 2,429,420 | McMaster | Oct. 21, 1947 |
| 2,478,817 | Gaiser | Aug. 9, 1949 |
| 2,522,531 | Mochel | Sept. 19, 1950 |
| 2,567,331 | Gaiser | Sept. 11, 1951 |
| 2,569,773 | Orr | Oct. 2, 1951 |